Feb. 14, 1928. 1,659,486
F. W. GRAY
CAN OPENER
Filed March 14, 1927
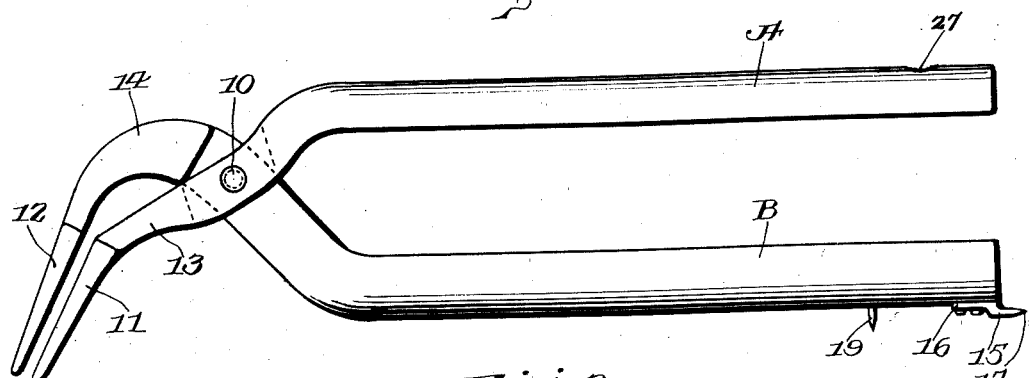
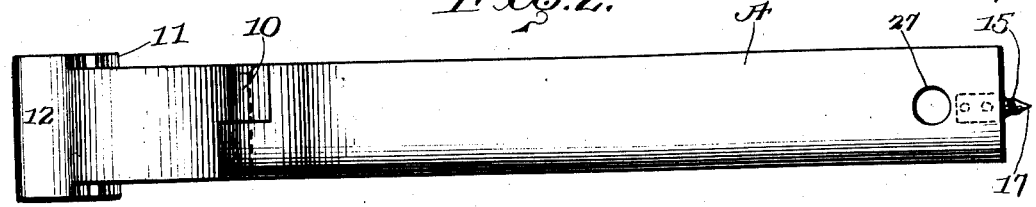
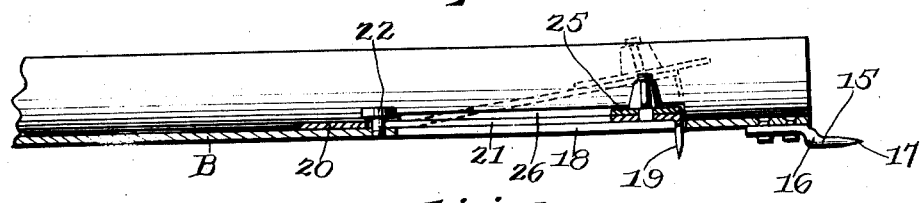
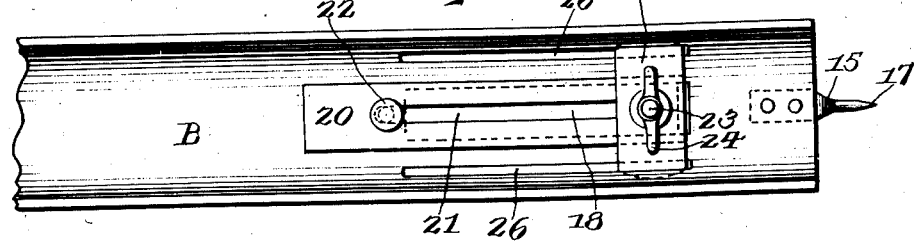
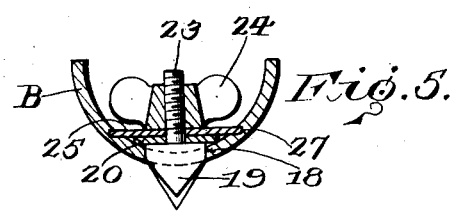
INVENTOR.
F. Wesley Gray,
BY
Geo. P. Kimmel ATTORNEY.

Patented Feb. 14, 1928.

1,659,486

UNITED STATES PATENT OFFICE.

FRANK WESLEY GRAY, OF AUSTIN, TEXAS.

CAN OPENER.

Application filed March 14, 1927. Serial No. 175,273.

The invention relates to a combination tool, and more especially to a tool for use as a pan lifter or can opener.

The primary object of the invention is the provision of a tool of this character, wherein a hot utensil or the like can be conveniently grasped and carried from one point to another, as for instance from a stove to a table or vice versa, the tool being of novel form to firmly hold both circular, square or other irregularly shaped utensil and eliminate the necessity of placing the hands upon the hot utensil when it is desired to move the same.

Another object of the invention is the provision of a tool of this character, wherein one handle of the same is constructed and arranged to permit the operation thereof for the removing of a top of a can for the opening of the same, the opener being of novel form, so that when not required for use, it will be concealed within the handle, whereby the tool can be utilized as a pan lifter or carrier.

A further object of the invention is the provision of a tool of this character, wherein the construction thereof will have certain advantages, as it renders the tool handy for several uses, namely, as a pan lifter, or a can opener.

A still further object of the invention is the provision of a tool of this character, which is extremely simple in construction, thoroughly reliable and efficient in its purposes, strong, durable, and inexpensive to manufacture.

With these and other objects in view, the invention consists in the features of construction, combination and arrangement of parts, as will be hereinafter more fully described in detail, illustrated in the accompanying drawing, and pointed out in the claims hereunto appended.

In the accompanying drawing:—

Figure 1 is a side elevation of the tool constructed in accordance with the invention.

Figure 2 is a top plan view thereof.

Figure 3 is a fragmentary vertical longitudinal sectional view through one of the handles of the tool, showing the can opener structure in full lines ready for use and in dotted lines out of position for use.

Figure 4 is a top plan view of the can opener.

Figure 5 is a vertical transverse sectional view through the handle showing the mode of locking the can opener in position for use.

Similar reference characters indicate corresponding parts throughout the several views in the drawing.

Referring to the drawing in detail the tool comprises a pair of handles A and B, respectively, pivotally connected by a cross pivot 10 and terminating in relatively wide jaws 11 and 12, respectively. These jaws 11 and 12 are flat and are adapted to contact at both sides of the wall of a utensil so that when the handles A and B are pressed toward each other the said jaws will firmly grip the body of the utensil for the lifting or carrying thereof. The portion 13 between the handle A and the jaw 11 is angularly disposed, while the portion 14 between the handle B and the jaw 12 is of substantially goose-neck shape, so that the jaws 11 and 12 will have confronting substantially parallel relationship, one to the other, whereby the said jaws will firmly grip and hold the body of a utensil, with a maximum bearing contact with the opposed faces of a wall of the body, to assure maximum grip of the tool in the use thereof.

It is of course understood that the portions 13 and 14 are reversely cut into from their side edges, so that the jaws will match each other in their pivotal relation.

Each handle A and B in cross section is of semi-circular formation with the bulge outwardly and riveted or otherwise made fast at the outer end of the handle B medially thereof on its outer face is a penetrating element 15 having the bight 16 substantially medially thereof or at the free end of the handle B, which is at a point removed from the pointed end 17 of said element. This element 15 can be utilized as a punch to puncture the top of a can and will serve as a pivot axis for the can opener feature of the tool hereinafter fully described.

Formed medially in the handle B spaced inwardly from its free end is an elongated slot 18 for accommodating a cutting spur or blade 19 bent outwardly from the resilient slide 20, the latter being formed centrally with a slot 21 for the adjustment of said slide 20 upon a retaining screw or stud 22, the latter being removably engaged in the handle B contiguous to the inner end of the slot 18 and in alignment therewith. The slide 20 when adjusted will position the blade 19 thereon at any desired point throughout the extent of the slot 18 in the handle B as will be apparent.

Mounted in the slide 20 is a threaded lug 23 on which is engaged an adjustable wing nut 24, the latter acting upon a retaining keeper or plate 25 which is centrally perforated to engage over the lug 23 and on the loosening of the nut 24 said plate 25 can be swung either in alignment with the slide 20 or at right angles crosswise thereof. When the plate 25 is in cross-wise position relative to the slide 20 it is engaged in grooves 26 formed in the inner face of the handle B parallel with each other and on opposite sides of the slot 18, the rounded end 27 of said plate 25 being brought into engagement in the grooves 26 or out of the same. When the keeper plate 25 is disengaged from the grooves 26 in the handle B, the slide 20 at its freed end portion by reason of the inherent resiliency therein will spring inwardly into the channel formation of the handle B, so that the cutter 19 will not protrude through the slot 18 in said handle.

When the cutter 19 protrudes through the slot 18 after adjustment of the slide 20 and engagement of the keeper 25 in the grooves 26 in the handle B the tool can be used as a can opener by having the element 15 penetrate the center of the top of the can and thereafter lower the handle B against the top of the can, so that by pressure upon the handle the cutter 19 will penetrate the top of the can near the perimeter thereof and by rotating the tool the top of said can will be cut from the body of the can to permit the emptying of the can.

In the handle A of the tool near its free end and centrally located is a suitable hole 27, the purpose of which is to permit the hanging of the tool upon a nail or other support, when the said tool is not in use.

From the foregoing it is thought that the construction and manner of use of the tool will be clearly understood and therefore a more extended explanation has been omitted.

What is claimed is:—

1. In a tool of the character described, a channeled handle, having spaced parallel grooves in its inner face and extending longitudinally of the handle, said handle having a slot medially relative to the grooves and co-extensive therewith, a resilient longitudinally slotted slide, means connecting the slide with the handle at the inner portion thereof, a blade carried by the slide and projected through the slot in said handle, means on the slide and adjustable for removable engagement in the grooves in the handle to project the blade through the slot in said handle, and a penetrating element carried by the handle at its outer free end and located centrally thereof.

2. In a tool of the character described, a channeled handle having a medial longitudinally disposed slot and also spaced parallel grooves at opposite sides of said slots and co-extensive therewith, a resilient slide adjustably connected in the channeled handle and normally bowed inwardly with respect thereto, a cutting blade carried by the slide and working through the slot in said handle, a penetrating element carried at the free end of the handle medially of the same, a plate carried by the slide and detachably engageable in the grooves to hold the blade protruded through the slot in the handle, and means for locking the plate either engaged in the grooves or disengaged therefrom.

In testimony whereof, I affix my signature hereto.

FRANK WESLEY GRAY.